(No Model.) 4 Sheets—Sheet 1.
M. JENSEN.
SOLDERING MACHINE.
No. 438,926. Patented Oct. 21, 1890.
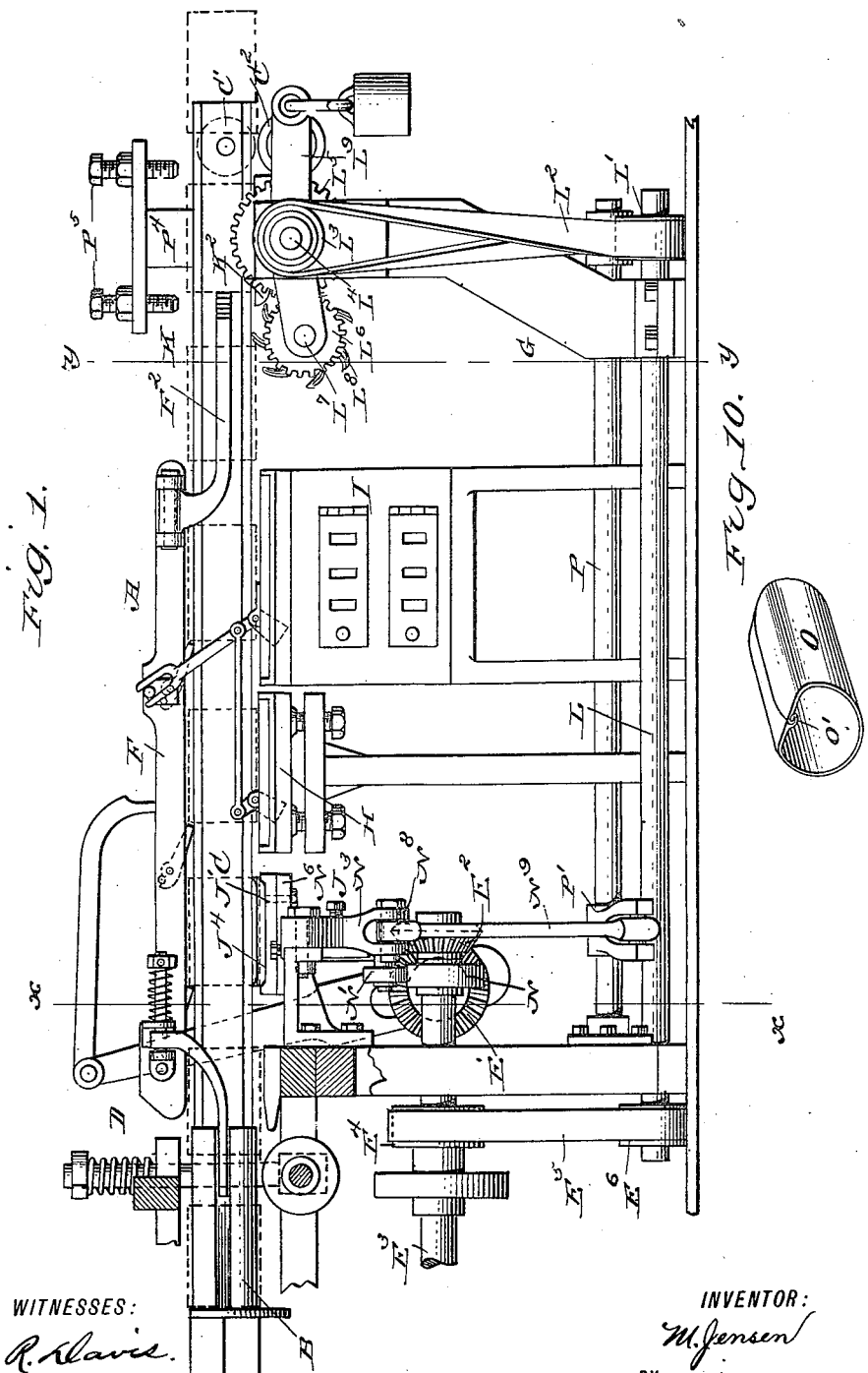
WITNESSES:
W. R. Davis
C. Sedgwick
INVENTOR:
M. Jensen
BY
ATTORNEYS (No Model.) 4 Sheets—Sheet 2.
M. JENSEN.
SOLDERING MACHINE.
No. 438,926. Patented Oct. 21, 1890.
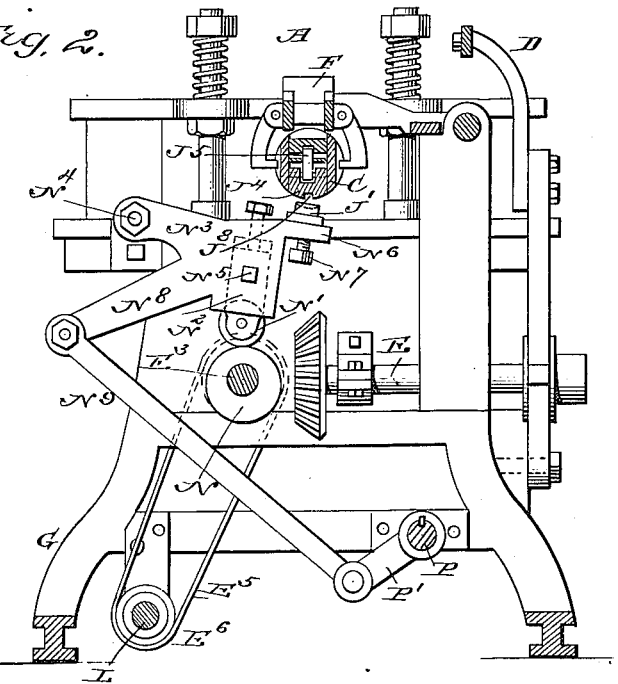
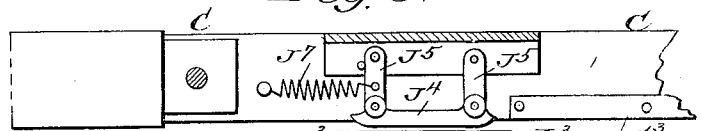
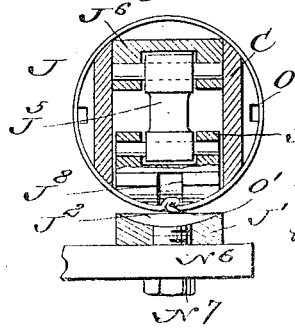
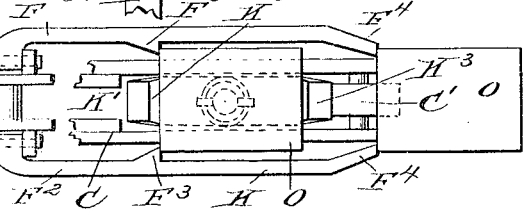
WITNESSES
INVENTOR:
M. Jensen
BY
ATTORNEYS

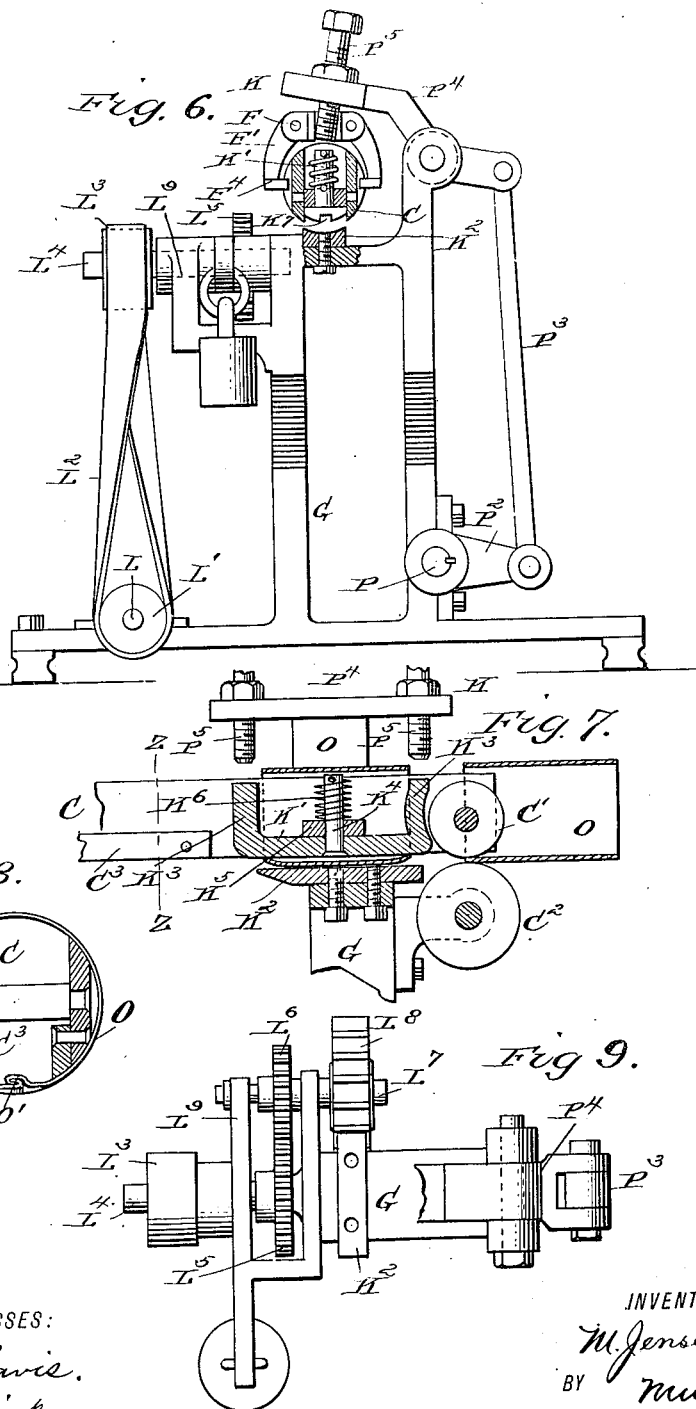

(No Model.) 4 Sheets—Sheet 4.
M. JENSEN.
SOLDERING MACHINE.
No. 438,926. Patented Oct. 21, 1890.
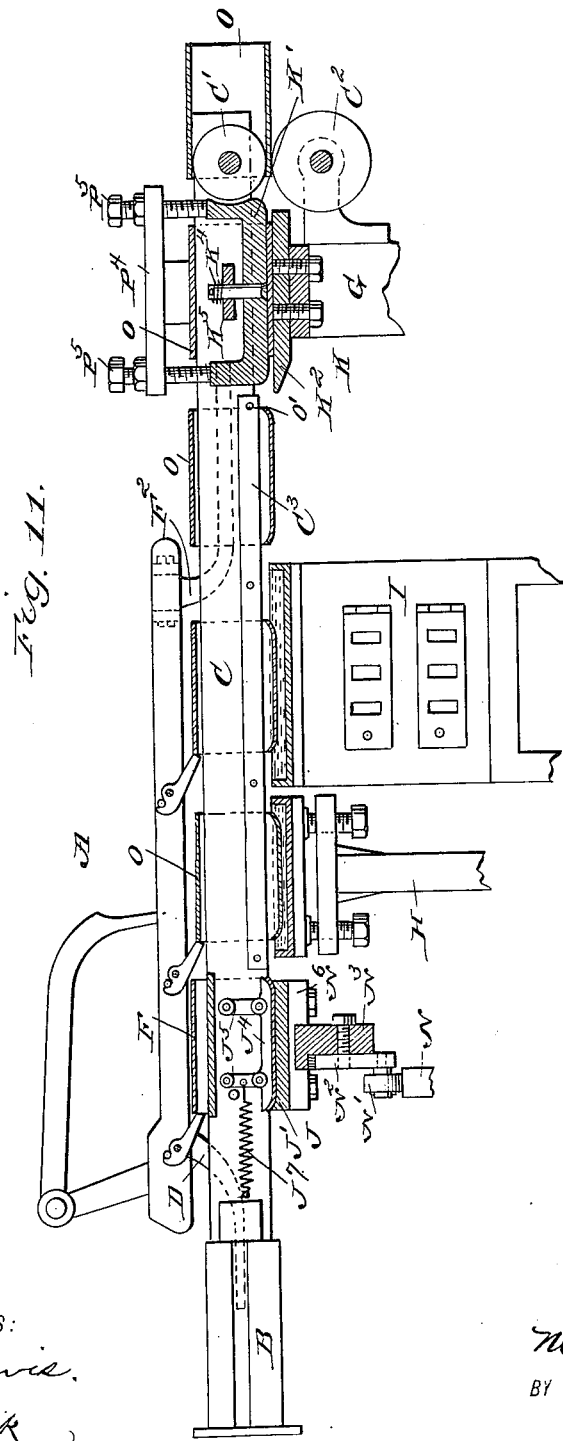
WITNESSES:
INVENTOR:
M. Jensen
BY
ATTORNEYS

UNITED STATES PATENT OFFICE.

MATHIAS JENSEN, OF ASTORIA, OREGON, ASSIGNOR TO THE JENSEN CAN FILLING MACHINE COMPANY, OF SAME PLACE.

SOLDERING-MACHINE.

SPECIFICATION forming part of Letters Patent No. 438,926, dated October 21, 1890.

Original application filed April 3, 1890, Serial No. 346,407. Divided and this application filed June 25, 1890. Serial No. 356,677. (No model.)

*To all whom it may concern:*

Be it known that I, MATHIAS JENSEN, of Astoria, in the county of Clatsop and State of Oregon, have invented a new and improved Machine for Soldering Sheet-Metal Can-Bodies, this being a division of application Serial No. 346,407, filed by me under date of April 3, 1890, and of which the following is a full, clear, and exact description.

The invention relates to machines for forming sheet-metal can-bodies, such as shown and described in the application for Letters Patent, Serial No. 331,011, filed by me November 20, 1889.

The object of the invention is to provide a new and improved machine for soldering sheet-metal can-bodies, and by which the solder is prevented from entering the insides of the bodies during the process of soldering, so as to prevent spoiling or poisoning the goods packed in the finished cans and save solder.

The invention consists of a device for bending the ends of the seam of each can-body inward preparatory to fluxing and soldering it; and it further consists of a device for straightening the seam after it is soldered and wiped.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement with parts in section. Fig. 2 is a transverse section of the same on the line *x x* of Fig. 1. Fig. 3 is an enlarged sectional side elevation of the bending device. Fig. 4 is an enlarged transverse section of the same with a can-body in position thereon. Fig. 5 is a plan view of the same. Fig. 6 is a transverse section of the improvement on the line *y y* of Fig. 1. Fig. 7 is an enlarged sectional side elevation of the can-body-straightening device. Fig. 8 is an enlarged transverse section of the same on the line *z z* of Fig. 7. Fig. 9 is a plan view of the seam and adjacent parts. Fig. 10 is a perspective view of the can-body after binding it; and Fig. 11 is a transverse section of the carrying-frame, the bending device, fluxing and soldering bath, and the straightening device.

The soldering-machine A, presently to be described, is preferably used in place of the soldering device in the machine for forming sheet-metal can-bodies shown and described in application for Letters Patent, Serial No. 331,011, above referred to. The sheet-metal blank is preferably formed into a cylindrical body with interlocked lips by the several devices shown and described in the said application, and then the body so formed passes from the horn B onto the carrying-frame C of the soldering-machine A by a reciprocating mechanism D, operated from the main driving-shaft E, as more fully described in the application above referred to. A second device F, also described in the above-mentioned application and operated from the transverse main driving-shaft E, serves to impart an intermittent motion to the several can-bodies on the carrying-frame C.

The front end of the carrying-frame C is pivotally connected with the end of the horn B, and the rear end of the said carrying-frame carries the roller C', adapted to rest on a roller C², mounted to turn in suitable bearings on the outer end of the bracket of the main frame C, on which the soldering-machine is mounted, the said main frame being part of the main frame for the machine for forming sheet-metal can-bodies described in the application above referred to.

The soldering-machine A is provided with a fluxing device H, arranged on the under side of the carrying-frame C and located alongside the soldering device I, both devices H and I being of the same construction as those described in the application, Serial No. 331,011, above referred to, so that a further detailed description of the same is not deemed necessary.

Between the fluxing device H and the end of the horn B is arranged a bending device J, for bending the ends of the seam of the can-body inward, as illustrated in Fig. 10, preparatory to the passing of the said can-body into the fluxing device H and the soldering device I. In the rear of the latter is arranged a straightening device K, which serves to straighten out the bent ends of the seam after the can-body has left the soldering device I. The said bending device J and the straightening device K are constructed as follows: Both devices are operated simultaneously from the main driving-shaft E, which for this purpose is provided with a bevel gear-wheel E', meshing into a bevel gear-wheel E², secured on the longitudinally-extending shaft E³, mounted to turn in suitable bearings on the main frame G. A pulley E⁴ is secured on the shaft E³, and over it passes a belt E⁵, also passing over a pulley E⁶, secured on the longitudinally-extending shaft L, mounted to turn in suitable bearings in the lower part of the main frame G and carrying on its outer end a pulley L', over which passes the quarter-twist belt L², also passing over a pulley L³, secured on a shaft L⁴, extending transversely and mounted to turn in suitable bearings on the outer bracket of the main frame G in line with the straightening device K. (See Fig. 9.) On the shaft L⁴ is secured a gear-wheel L⁵, which meshes into a gear-wheel L⁶, secured on the shaft L⁷, carrying the wiper L⁸, which serves to wipe the seam of the can-body before it passes to the straightening device K. The shaft L⁷ is mounted to turn in a frame L⁹, fulcrumed on the shaft L⁴ and counterbalanced by a weight, so as to press the wiper L⁸ in contact with the under side of the seam of the can-body.

On the shaft E³, previously mentioned, is arranged a cam-wheel N, on the periphery of which travels a friction-wheel N', mounted to turn in a plate N², held vertically adjustable on a lever N³, fulcrumed at N⁴ to the main frame G, the said plate being secured in place when adjusted by a set-screw N⁵. (See Figs. 2 and 3.) On the lever N³ is formed a longitudinally-extending arm N⁶, on the top of which is secured the male die J' of the bending device J, the said die being secured in place on the arm N⁶ by suitable set-screws N⁷, as is plainly shown in Figs. 3 and 4. The male die J' is provided on its top with a concave recess J², the ends of which are curved upward at J³, as is plainly illustrated in Fig. 3. Over this concave recess is adapted to operate the female die J⁴, similar in shape to the recess J² and supported on the links J⁵, extending vertically and pivoted on a cross-plate J⁶, secured between the sides of the carrying-frame C. A spring J⁷ is secured by one end to the carrying-frame C and by its other end to one of the links J⁵, so as to hold the latter, and consequently the female die J⁴, in a normal position, at the same time permitting the said links J⁵ to swing longitudinally in order to raise the female die J⁴ when the can-body is moved forward from the bending mechanism J.

On the under side of the female die J⁴ is arranged a longitudinal groove J⁸, into which is adapted to pass the seam O' of the can-body O under treatment when in the bending mechanism J. The female die J⁴, as well as the recess J² in the male die J', is of the same length as the can-body, so that when the latter is between the said dies and the lever N³ is swung upward the said male die J' presses against the under side of the can-body and the latter against the female die J⁴, so that the ends of the can-body are bent inward by the curved ends J³ of the said recess and female die. The can-body O then assumes the shape shown in Fig. 10. It is understood that the seams O' of the can-bodies passing along the carrying-frame are always on the under side.

When the shaft E³ is rotated from the main driving-shaft E, the cam N, acting on the friction-wheel N', causes the lever N³ to swing upward, so as to impart the necessary upward motion for bending the can-body to the said male die J'. When the highest point of the cam N has passed the friction-wheel N', the lever N³ swings downward by its own weight until the friction-wheel N' stands at the lowermost point of the said cam, as is plainly shown in Fig. 2. Now, in order to operate the straightening mechanism K simultaneously with the bending mechanism J, the said lever N³ is provided with an arm N⁸, pivotally connected by a link N⁹ with an arm P', secured on a longitudinally-extending shaft P, mounted to turn in suitable bearings in the lower parts of the main frame G. On the outer end of the said shaft P is secured an arm P², pivotally connected by a link P³ with a lever P⁴, fulcrumed on the top and on the outer bracket of the main frame G in line with the shaft L⁴, previously described. The lever P⁴ extends inward and over the carrying-frame C, and is provided at its inner end with adjustable bolts P⁵, adapted to operate the male die K' of the straightening device K, the said die being located between the sides of the carrying-frame C and over the female die K², secured on the outer bracket of the main frame G. The male die K' is made U-shaped, with its ends K³ extending upward between the sides of the carrying-frame C, the upper ends being adapted to be engaged by the bolts P⁵, held on the lever P⁴. The distance between the ends K³ of the male die K' is equal to the length of the can-body under treatment, so that when the can-body is in place on the male die, as plainly illustrated in Fig. 7, and the lever P⁴ descends, then the lower ends of the bolts P⁵ can press onto the ends of the said male die without striking the can-body resting between the ends of the die. The male die K' is held on a bolt K⁴, secured to its bottom and extending upward through a transverse plate K⁵, secured to the sides of the carrying-frame C. A spring K⁶ is coiled on the upper end of the bolt K⁴, and is secured by one end to the said bolt and rests at its other end on the top of the plate K⁵, so that when the die is pressed downward by the bolts P⁵ the spring K⁶ is compressed and draws the die upward to its normal position when the lever P⁴ swings upward. The female die K² is concave on its surface, and the under side of the male die is correspondingly shaped, and is also provided with a longitudinally-extending groove K⁷ for the reception of the inside of the seam.

The can-body O is moved into the proper position on the male die K' from the reciprocating device F, which is provided at its rear end with longitudinally-extending arms F' and F², passing to the sides of the carrying-frame C and provided with lugs F³, which engage the inner edges of the can-bodies, so that when the device F is reciprocated and is on its outward stroke the extreme outer ends of the said arms engage the can-body on the die K' and shove the can-body off of the latter and over and between the rollers C' and C², from which they drop into a suitable receptacle. At the same time the lugs F³ move a new can-body onto the die K' to the position shown in Fig. 7.

In order to prevent the can-bodies from turning between the bending device J and the straightening device K, the insides of the sides of the carrying-frame C are provided with longitudinally-extending strips C³, adapted to pass at their inner edges onto the straight part of the bent ends of the can-body, as is plainly shown in Fig. 8, whereby a turning of the can-body is prevented.

The operation is as follows: When the main driving-shaft E is set in motion, the several can-bodies receive an intermittent forward motion on the carrying-frame C by the reciprocating device F. The can-body, after leaving the horn B, is passed between the dies J' and J⁴ of the bending device J, and as soon as the reciprocating device F is on its return-stroke and the several can-bodies on the carrying-frame C are at rest then the cam N swings the lever N³ upward, so that the male die J' bends the ends of the can O into the shape shown in Fig. 10. As soon as this has been accomplished the lever N³ swings downward, and then the reciprocating device F moves the bent can-body forward onto the fluxing device H, in which the acid is passed into the seam or only on the outside, as the bent upper ends O' of the said can-body O prevent the acid from passing to the inside. After this is accomplished, at the next forward stroke of the reciprocating device F the bent and fluxed can-body O is passed onto the soldering device I, in which the solder is passed onto the outside of the seam only, as the bent upper ends O' of the said can-body prevent the solder from passing to the inside of the can as long as the latter is held with its under side on top of the solder bath. At the next forward stroke of the reciprocating device F the soldered can-body passes to an intermediate position between the soldering device I and the straightening device K, and at the next following forward stroke of the said reciprocating device the can-body passes over the wiper L and onto the male die K' of the straightening device K. During the time the reciprocating device F makes its return-stroke the lever P⁴ swings downward, so that the male die K' is pressed downward and by its under side straightens out the bent end of the can-body as the said can-body is pressed onto the stationary female die K². As soon as the lever P⁴ swings upward the spring K⁶ raises the male die K' to its former position, and the next following forward stroke of the reciprocating device F moves the straightened and soldered can-body off of the machine. It is understood that as the male die J' of the bending device J moved upward and presses against the under side of the can-body the lever P⁴ swings downward at the same time, so that an equal pressure is exerted on the top and bottom of the carrying-frame C to prevent the latter from being raised, which would be the case if the lever P⁴ did not swing downward at the same time that the lever N³ swings upward.

Having thus fully described my invention, I claim as new and desire to secure by Letters Patent—

1. In a can-forming machine, the combination, with the longitudinally-extending frame along and around which the seamed can-bodies are fed and the soldering device thereunder, of a bending device in advance of said soldering device for pressing the ends of the can-body at the seam inwardly prior to their delivery to said soldering device, substantially as described.

2. The combination, with the horn of a can-forming machine, the frame upon and around which the seamed can-bodies are passed from said horn seam downward, and a soldering device under the frame, of a bending-machine in advance of the soldering device to press the ends of the can inwardly at the seam prior to their delivery to the soldering device, substantially as described.

3. The combination, with a carrying-frame for the seamed can-bodies and a soldering device over which said frame passes, of a bending device in advance of the soldering device to press the ends of the can-body inwardly at the seam to prevent the entrance of solder into the can and a feeding mechanism to successively present the can-body to the said bender and soldering device, substantially as described.

4. In a soldering-machine for can-bodies, the combination, with a soldering device, of a bending device for bending the can-body at its ends on the seam preparatory to the passing of the can-body into the said soldering device and a straightening device for straightening the bent ends of the can-body after it leaves the said soldering device, substantially as shown and described.

5. In a soldering-machine, the combination, with a horizontally-extending carrying-frame along and around which the seamed can-bodies are passed, of a bending device to press the end of the body inward at the seam, comprising a female die mounted centrally between the sides of the frame and a vertically-movable male die below said frame, and between which dies the can-bodies pass as they are moved along the frame, substantially as described.

6. In a soldering-machine, the combination, with a carrying-frame, of a female die hung on links in the said carrying-frame, a male die held opposite the said female die below the said carrying-frame, and a lever supporting the said male die and moving the same toward and from the said female die, substantially as shown and described.

7. In a soldering-machine, the combination, with a carrying-frame, of a female die hung on links in the said carrying-frame, a male die held opposite the said female die below the said carrying-frame, a lever supporting the said male die and moving the same toward and from the said female die, and means, substantially as described, for imparting a swinging motion to the said lever, as set forth.

8. In a soldering-machine for can-bodies, the combination, with a carrying-frame and a reciprocating mechanism for moving the can-bodies on the said carrying-frame, of a female die held in the said carrying-frame and links adapted to swing longitudinally and carrying the said female die to permit the said reciprocating mechanism to move the can-bodies past the said female die, substantially as shown and described.

9. In a soldering-machine for can-bodies, the combination, with a carrying-frame and a reciprocating mechanism for moving the can-bodies on the said carrying-frame, of a female die held in the said carrying-frame, links adapted to swing longitudinally and carrying the said female die to permit the said reciprocating mechanism to move the can-bodies past the said female die, and a spring connected with the said links to return the female die to its normal position, as set forth.

10. In a soldering-machine for can-bodies, the combination, with a carrying-frame, of a straightening device comprising a male die mounted yieldingly in the said carrying-frame and a fixed female die arranged opposite the said male die and held on the under side of the said carrying-frame, substantially as shown and described.

11. In a soldering-machine for can-bodies, the combination, with a carrying-frame, of a straightening device comprising a male die mounted yieldingly in the said carrying-frame, a fixed female die arranged opposite the said male die and held on the under side of the said carrying-frame, and means, substantially as described, for imparting a sliding motion to the said male die, as set forth.

12. In a soldering-machine for can-bodies, the combination, with a fixed female die, of a male die having bent-up ends and onto which is adapted to pass the can-body between the said ends, and means, substantially as described, for pressing the ends of the said male die to move the latter toward the female die, substantially as shown and described.

13. In a can-body-forming machine, the combination, with the carrying-frame, of a male die fitted between the sides of the said carrying-frame and having projecting ends, a bolt supporting the said male die and held to slide in the said carrying-frame, and a spring pressing on the said bolt to hold the said die in a normal position, substantially as shown and described.

14. In a can-body-forming machine, the combination, with the carrying-frame, of a male die fitted between the sides of the said carrying-frame and having projecting ends, a bolt supporting the said male die and held to slide in the said carrying-frame, a spring pressing on the said bolt to hold the said die in a normal position, and a lever mounted to swing and provided with adjustable bolts adapted to engage the ends of the said male die, substantially as shown and described.

15. In a soldering-machine for can-bodies, the combination, with a carrying-frame, of a bending device having a female die held in the said carrying-frame, a male die mounted to move toward the said female die on the under side of the said carrying-frame, and a straightening device having a fixed female die on the under side of the said carrying-frame, a male die held movably in the said carrying-frame, and a lever pressing downward on the said male die, so as to balance the pressure on the said carrying-frame relative to the said bending device, substantially as shown and described.

16. In a forming and soldering machine for can-bodies, the combination, with a carrying-frame, of a bending device having a female die held in the said carrying-frame, a male die mounted to move toward the said female die on the under side of the said carrying-frame, and a straightening device having a fixed female die on the under side of the said carrying-frame, a male die held movably in the said carrying-frame, a lever pressing downward on the said male die, so as to balance the pressure on the said carrying-frame relative to the said bending device, and an intermediate mechanism, substantially as described, for imparting a simultaneous movement to the male die of the said bending device and the male die of the said straightening device, as set forth.

MATHIAS JENSEN.

Witnesses:
G. C. FULTON,
M. I. HOBSON.